F. P. ARCHER.
ENTRENCHING TOOL.
APPLICATION FILED FEB. 15, 1916.
1,204,332.
Patented Nov. 7, 1916.
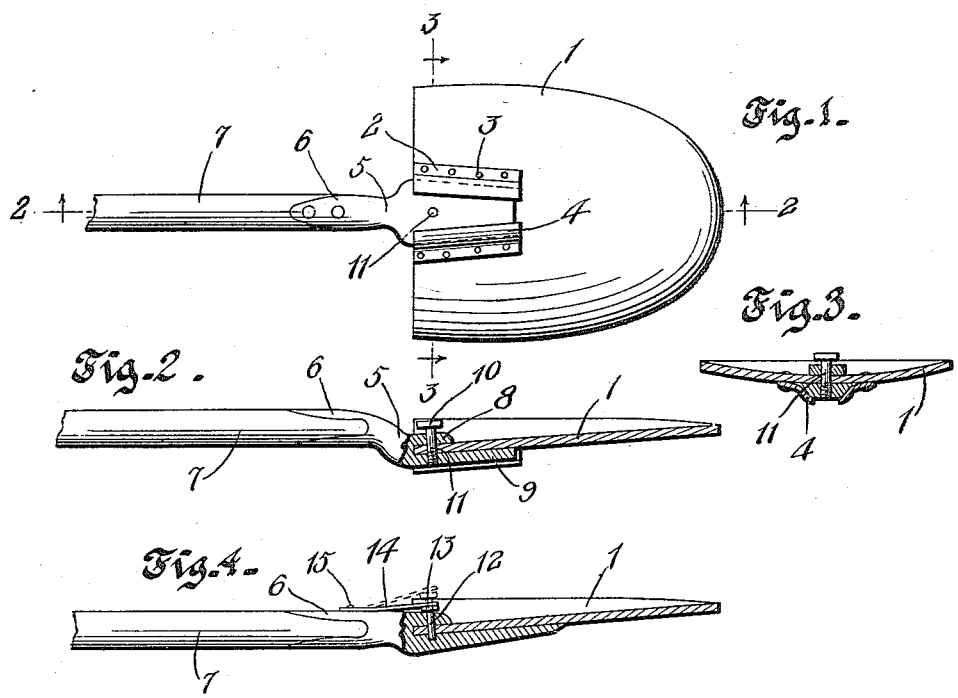

UNITED STATES PATENT OFFICE.

FLOYD P. ARCHER, OF WILKES-BARRE, PENNSYLVANIA.

ENTRENCHING-TOOL.

1,204,332.

Specification of Letters Patent.

Patented Nov. 7, 1916.

Application filed February 15, 1916. Serial No. 78,494.

*To all whom it may concern:*

Be it known that I, FLOYD P. ARCHER, a citizen of the United States, residing at Wilkes-Barre, in the county of Luzerne and State of Pennsylvania, have invented certain new and useful Improvements in Entrenching Tools, of which the following is a specification.

This invention relates to digging implements, and more particularly has for its object, the provision of an improved entrenching tool.

A characteristic if the present invention is embodied in the improved construction and formation of the means for detachably connecting the digging implements with a handle member whereby the tool may be readily removed from the handle to enable the carrying thereof.

Other features of the invention reside in an improved manner of detachably securing the digging implement in a positive manner to its handle member; the simple construction of the detachable head portion, constructed with a bifurcated portion, whereby the connection with the shovel or digging implement is reinforced, and the simple and inexpensive construction and arrangement of the various constituent parts.

All of the foregoing together with additional advantageous details and arrangements of parts of the preferred embodiments of my invention will be clear from the specific description hereinafter contained when read in connection with the accompanying drawings forming a part thereof, wherein said embodiment of the invention is illustrated for the purpose of facilitating a full understanding of the present improvements.

In the drawings:—Figure 1 is a rear elevation of the device in assembled condition; Fig. 2 is a longitudinal section therethrough; Fig. 3 is a transverse section, taken on the line 3—3 of Fig. 1; Fig. 4 is a longitudinal section showing a modified form of fastening device.

Referring now more specifically to the drawings and in connection with which like reference characters will refer to the same parts in the several views, 1 represents a shovel of conventional construction and formation and formed from a highly tempered metal, having secured thereto guide members 2, by means of rivets or other devices as shown at 3. The guide members 2 are formed with downwardly extending flanges 4, and are so positioned upon the shovel as to gradually taper toward a common center.

5 represents a head portion formed with a hollow portion and having its outer ends terminating in a bifurcated portion 6, adapted to receive a handle part 7. The remaining end of the portion 5 is provided with arms 8 and 9, the latter being of a greater length than the former, and being of a shape to conform with the opening afforded by the guideways 2, whereby the same may be conveniently received thereby. In order that the arms 8 and 9 may be fastened to the shovel portion 1, there is provided a bolt 10 adapted to be received within registering openings arranged in the said arms and the shovel, the opening in the arm 9 being interiorly threaded so that the threaded portion 11 of the bolt may be turned into engagement therewith.

In the modification as illustrated by Fig. 4 upon the drawings, there is provided a connecting pin 12, having a head portion 13 adapted to be received and secured to a leaf spring 14, which is fastened to the bifurcated shank portion 6, as shown at 15. By this arrangement it is obvious that the construction which has been heretofore described may be firmly secured, and further, may be quickly and readily disassembled, which is especially desirable in an implement of the character described.

From the foregoing, it is evident that I have provided an entrenching implement which is simple and practical for the purpose to which it is adapted and which may be manufactured at a minimum cost.

When the shovel part 1 is not being used for digging purposes, it is proposed that the same should be carried within a suitable pocket arranged in the wearing apparel of the user, and which is so positioned as to cover a vital part of the body. Consequently, the device may serve for the dual function of a digging implement and also a shield.

Different arrangements of the parts from those shown herein and described for producing the desired result may be employed together with mechanical equivalents for some or all of said parts, but I have utilized the present combinations for the production of a serviceable and practical entrenching implement, with the intention of using any resultant construction, as may be in keeping with the hereto appended claims.

Having thus described the invention, what I claim, is:—

1. An entrenching tool including a digging member, converging flanged strips secured to said digging member, a bifurcated handle having one portion engaging the digging member and the other portion received by said flanged strips, and spring-held means for locking said digging member with said handle portions.

2. An entrenching tool, including a digging member, converging channeled ways arranged upon said digging member, a bifurcated handle having one portion thereof engaging the digging member, and the other portion thereof received by the channeled ways, and means for locking the said digging member to said handle portion.

3. An entrenching tool including a digging member, converging channeled ways arranged upon said digging member, a bifurcated handle having one portion thereof engaging the digging member, and the remaining portion received by said channeled ways, and means for locking the digging member to the handle.

4. An entrenching tool including a digging member, converging channeled ways arranged upon said digging member, a bifurcated handle having one portion engaging the digging member, and the other portion received by said channeled ways, a movable pin engaging the digging member and the bifurcated portion of the handle, and spring means engageable with said pin for holding the same in engaged position.

In testimony whereof I affix my signature in presence of two witnesses.

FLOYD P. ARCHER.

Witnesses:
BENJAMIN H. PIERSON,
THEO REINEFELD.

Copies of this patent may be obtained for five cents each, by addressing the "Commissioner of Patents, Washington, D. C."